US007287004B2

(12) United States Patent
Kenny et al.

(10) Patent No.: US 7,287,004 B2
(45) Date of Patent: Oct. 23, 2007

(54) SYSTEM FOR PROVIDING INTEGRATED FINANCING SERVICES

(75) Inventors: Tara M. Kenny, Danbury, CT (US); Kathryn Mark, Ridgefield, CT (US); James Penney, Trumbull, CT (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 10/746,093

(22) Filed: Dec. 26, 2003

(65) Prior Publication Data
US 2005/0149408 A1 Jul. 7, 2005

(51) Int. Cl.
*G06Q 30/00* (2006.01)
*G06Q 40/00* (2006.01)

(52) U.S. Cl. .............................. 705/26; 705/38; 705/27
(58) Field of Classification Search .................. 705/26, 705/27, 38
See application file for complete search history.

(56) References Cited

U.S. PATENT DOCUMENTS

| 5,710,889 | A   | 1/1998  | Clark et al. ................. 235/379 |
|-----------|-----|---------|----------------------------------------|
| 5,890,140 | A   | 3/1999  | Clark et al. .................... 705/35 |
| 6,058,378 | A   | 5/2000  | Clark et al. .................... 705/37 |
| 6,330,548 | B1* | 12/2001 | Walker et al. ................. 705/38  |
| 7,099,842 | B1* | 8/2006  | Nault et al. ................... 705/38  |
| 7,139,731 | B1* | 11/2006 | Alvin .......................... 705/35  |
| 7,222,092 | B2* | 5/2007  | Grove et al. .................. 705/26  |
| 2003/0041012 | A1* | 2/2003 | Grey et al. .................... 705/37 |
| 2003/0182229 | A1* | 9/2003 | Siegel et al. ................... 705/39 |
| 2004/0019634 | A1* | 1/2004 | Van Geldern et al. ...... 709/203 |
| 2004/0059674 | A1* | 3/2004 | Hatano et al. ................. 705/40 |
| 2004/0088216 | A1* | 5/2004 | Bangalore .................... 705/14 |

FOREIGN PATENT DOCUMENTS

| JP | 2001357320 A | * | 12/2001 |
| JP | 2002007703 A | * | 1/2002 |
| JP | 2002203187 A | * | 7/2002 |
| KR | 2001008024 A | * | 2/2001 |
| KR | 2001095857 A | * | 11/2001 |
| KR | 20020068152 A | * | 8/2002 |

OTHER PUBLICATIONS

Anon., "eDentalStore Teams up with Leading Finance Companies to Add Online Practice Financing at Preferred Low Rates," Business Wire, Feb. 22, 2000.*
Gamble, R.H., "New Paradigm for Trade Credit: On-Line Marketplaces Introduce Third-Party Lenders, Market Pricing," Business Credit, vol. 102, No. 6, pp. 30-34, Jun. 2000.*
Anon., "Tech Data U.S. and American Express Introduce New Leasing Program for Technology Resellers," PR Newswire, May 14, 2002.*
Anon., "Customer Credit Scores Enhance LeaseCompare.com, Eliminates Credit Discrimination," PR Newswire, Nov. 12, 2002.*

* cited by examiner

*Primary Examiner*—Nicholas D. Rosen
(74) *Attorney, Agent, or Firm*—Samuel A. Kassatly

(57) ABSTRACT

An integrated financing services system provides a leasing service for vendors accessible through the Internet, embedding financing into the checkout process using several Web services. The present system is accessed by a vendor to provide lease prices on a line item by line item basis within an electronic shopping catalog. Depending on the detail provided by the sales company in the request for those rates, these lease prices can map to the specificity of the catalog. The present system provides a service for the vendors to integrate leasing into their sales agents' and customers' shopping experience without a large investment in a flexible, and customer-customizable way. The lessor can now support vendors and customers in a very repeatable manner, using the same technology with no new special development for each vendor.

23 Claims, 10 Drawing Sheets

500

VIEW CART

THE ITEMS YOU HAVE PLACED IN YOUR SHOPPING CART APPEAR HERE. MAKE CHANGES OR ADDITIONS, OR CONTINUE SHOPPING, THEN SELECT UPDATE CART.
FINISHED SHOPPING? SELECT CHECK OUT.

DISPLAY CURRENCY: United States Currency (USD)

☒ WOULD YOU LIKE ITEMS IN THIS CART TO SHIP TOGETHER?

| | YOUR SHOPPING CART | |
|---|---|---|
| Quantity | Description Part No. | Price |
| 1 | Desktop | 1,000 USD |
| 1 | Monitor | 500 USD |
| 2 | Subtotal | 1,500 USD |

- Update cart
- Continue shopping
- Save cart
- Empty cart

- Checkout  _510_
- Request Leasing  _515_

Click here to calculate period lease payments for the items in your shopping cart

Lease payment results:

Please review your lease payment results below. If multiple terms are available for any product in your cart, a drop down list has been provided for you to change the terms and re-calculate your lease payment.

Please note: These lease payment results are estimates and are subject to change based on your contract DISPLAY CURRENCY: United States Currency (USD)

| Qtty | Description Part No. | Item Price | Line Total | Monthly Lease Payment | Lease Option (605) | Term (610) | Offer (615) |
|---|---|---|---|---|---|---|---|
| 1 | Desktop | 1,000 USD | 1,000 USD | 100 USD | FPO | 24 Mos | EZrate |
| 1 | Monitor | 500 USD | 500 USD | 50 USD | FMV | 24 Mos | EZrate |
| 1 | Laptop | 1,500 USD | 1,500 USD | The periodic lease payment could not be calculated for this line item. The periodic lease price will be reflected in your invoice. (620) | | | |

Total monthly lease payment: 150 USD

| Recalculate (625) | Accept lease prices (630) | Continue shopping (635) |
|---|---|---|
| Click here to calculate lease payments based on a different term, offering, or lease option | Click here to accept these lease prices | Click here to return to shopping without lease prices |

FIG. 6

SYSTEM FOR PROVIDING INTEGRATED FINANCING SERVICES

FIELD OF THE INVENTION

The present invention generally relates to the field of customer financing, and particularly to a software system, service, a computer program product, and an associated method to finance high value customer sales over the Internet, that are secure, customizable, and available on demand as the customer transaction occurs. More specifically, this invention pertains to an e-business method that allows vendors to electronically interact with a leasing organization to present either a planning lease quote for a generic or entitled customer that a customer can use for comparison purposes, or a committed lease quote for a specific customer, thus providing a new way of incorporating financing payment options to existing sales systems and sales points of presence over the internet.

BACKGROUND OF THE INVENTION

The World Wide Web (WWW) or Internet is comprised of an expansive network of interconnected computers upon which businesses, governments, groups, and individuals throughout the world maintain inter-linked computer files known as Web pages. Originally, the Internet was devised for the transfer of information. More recently, the Internet has increasingly been used as a shopping tool for users, much like an electronic catalogue. The increasing number of Internet users purchasing products over the Internet has resulted in significant changes in the approach businesses take to product sales, converting from a standard business model to an electronic business, or e-business model.

In a customer's shopping experience, either on the Web or through a salesperson, the offer presented to the customer typically doesn't present a valid lease option for payment unless the vendor has involved a leasing sales representative or uses non-committed planning rates in creating the offer document. For example, a customer wishes to purchase a computer from a vendor, either in person, or from the vendor's Web site. The vendor can readily incorporate a purchase price for the cost of the computer in the customer's offering catalog. However, the vendor does not have a simple, on-demand electronic leasing service that automatically presents timely lease prices concurrently with the purchase price. To be able to present interest rate and customer credit accurate lease prices along with the purchase price of the computer electronically, the vendor will need to make a relatively large and possibly a prohibitive investment in sales system development along with a proprietary-like commitment to a partnership with one or more third party lessors.

In the on-demand world, retailers and wholesalers require the ability to easily and readily integrate lease options into their sales solutions for their customers at the time of shopping and checkout at any point of sale. The sales tool medium can range from a house-grown product and service configurator that the vendor uses to pull together an offer proposal to an e-procurement (electronic procurement) system. One example of an e-procurement system currently used is the Ariba® software.

Vendors need to be able to dynamically support those B2B and non-B2B sales systems with leasing options cheaply and flexibly for the different ways customers do business with them.

Numerous customers have turned to e-procurement systems to automate and streamline their procurement processes. Several third-party companies have created e-procurement systems for those customers to use as a business to business ("B2B") solution or tool to manage procurement in their companies. A lack of leasing integration with e-procurement systems will affect the ability for customers to buy products on lease and limit their choices a time of buy.

What is therefore needed is a system, a service, a computer program product, and an associated method that allow companies to electronically interact with a leasing organization, to present either a planning lease quote for a generic customer that a customer can use for comparison purposes, or a committed lease quote for a specific customer. Vendors and customers using electronic procurement (or e-procurement) systems are in need of a leasing solution that is flexible and that provides better integrated leasing prices at time of checkout. This solution should avoid re-keying and disjointed processes. In addition, the solution should support all sales methods (including e-procurement processes), providing financing prices in catalogs and checkout. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for providing a financing services solution for leasing. The present system includes a leasing Web services (known as Integrated Financing Services) that can be readily used by any vendor. The vendor sends its request for a lease or leasing information over a network, such as the Internet, in the format of, for example, an XML database for an immediate response of a lease quote or lease configuration screen. The communication protocol might be, for example, TCP/IP with an XML data structure. This process is initiated from any point of sale shopping and checkout processes using several Web services.

The first Web service is accessed by a vendor to provide leasing prices on a line item-by-line item basis within an electronic shopping catalog. Depending on the details provided by the vendor in the request for those rates (at catalog build and update), the lease prices can map to the specificity of the catalog. In other terms, if the vendor has a catalog designed for a specific customer or industry, the provided lease prices can be tailored to those specifications as well.

The second Web service is accessed at customer checkout when a payment option is being selected. The present system calculates the final lease price in the form of a proposal or firm rate, depending on the level of approvals previously attained between the customer and lessor or accepted risk within the lessor.

The third Web service is accessed by the vendor's sales agent to validate that the shipment should be made to the customer based on completion of the leasing (or lease) agreement.

The Web services as designed provide the added advantage of supporting various lessor and lessor's third party backoffice systems to provide lease rates for catalog support in both a manual and automated-process.

The present system meets high-level requirements for providing integrated processing support of an end-to-end flow from customer e-procurement and vendor systems through lessor processes, and returning the appropriate responses back to the requesting systems.

The present system also provides the ability to calculate and display periodic lease payments under the customer's shopping experience. In addition, the present system provides the ability to flow lease order detail into fulfillment systems. The lease detail will pass back to the lessor upon shipment from the vendor fulfillment system as part of the vendor invoice to process the lease.

These high-level requirements support, for example, the business-to-business, vendor configurator tool and Web site process flow for entitled catalog and lease offer creation, customer shopping experience, and order management. The present system can provide leasing support for companies such as vendors and third party companies that sell products supplied by several vendors.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 5 is a screen shot illustrating a shopping cart service provided by the financing services system of FIG. 1;

FIG. 6 is a screen shot illustrating a financing selection service provided by the financing services system of FIG. 1.

DETAILED DESCRIPTION OF PREFERRED EMBODIMENTS

Figure 1:
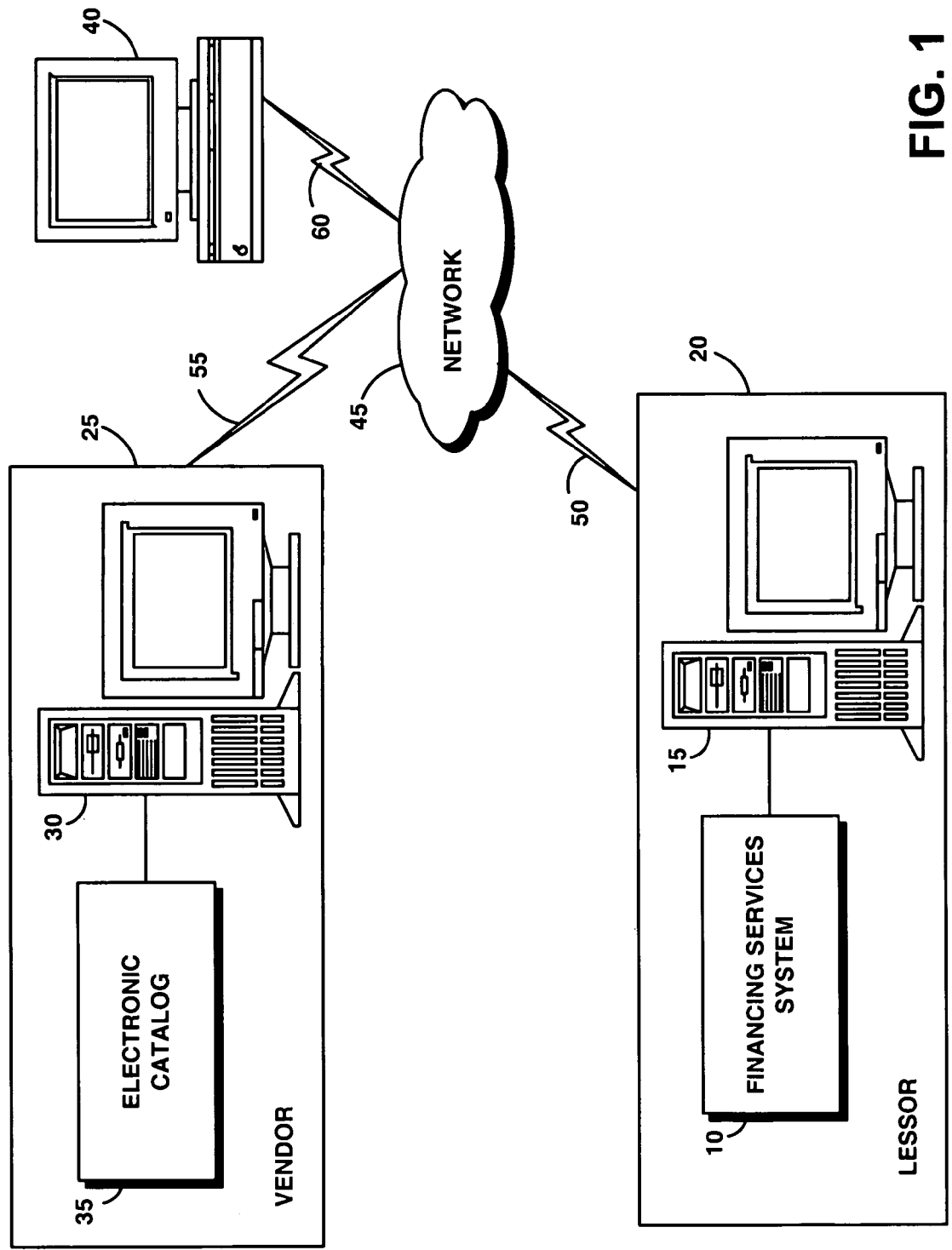
FIG. 1 is a schematic illustration of an exemplary operating environment in which a financing services system of the present invention can be used.

The following definitions and explanations provide background information pertaining to the technical field of the present invention, and are intended to facilitate the understanding of the present invention without limiting its scope:

Configured to Order: A term for products that require configuration to form a complete product.

Financing: Loans made direct to the customer without collateral. Anything other than a standalone loan to a customer would be referred to as Leasing.

Internet: A collection of interconnected public and private computer networks that are linked together with routers by a set of standard protocols to form a global, distributed network.

Leasing: A leasing company acquires assets on behalf of the end-user customer and retains title of the asset for the duration of the lease. The asset is retained as collateral against the lease until the end of the lease. At this time the customer may choose to purchase the asset, return it or, renew the lease.

Offer: A set of lease rates, lease payments, terms and conditions presented to a customer by the lessor.

TCP/IP: The transmission control protocol (TCP) on top of the Internet protocol (IP). The Internet protocol is a connectionless protocol providing packet routing. TCP is a connection-oriented protocol providing reliable communication and multiplexing.

Web Site: A database or another collection of inter-linked hypertext documents ("Web documents" or "Web pages") and associated data entities, which is accessible via a computer network, and which forms part of a larger, distributed informational system such as the WWW. In general, a Web site corresponds to a particular Internet domain name, and includes the content of a particular organization. Other types of Web sites may include, for example, a hypertext database of a corporate "Intranet" (i.e., an internal network which uses standard Internet protocols), or a site of a hypertext system that uses document retrieval protocols other than those of the WWW.

Vendor: A person or a legal entity, such as a company, that sells products and services that wishes to include lease options in the sales offer.

Sales Agent: A salesperson (or application) who works in the vendor's company and who may personally be completing the sale.

Fulfillment Agent: An administrative person completing the order and shipment for the customer. This person works for the vendor as well.

Lessor: A person or a legal entity, such as a company, that underwrites the lease offer that the vendor includes in his or her offer.

Entitled Customer/Entitled Prices: A pre-contracted leasing customers. Lease rates and credit terms are contractually agreed to between the lessor and the customer prior to shopping.

World Wide Web (WWW, also Web): An Internet client-server hypertext distributed information retrieval system.

XML: eXtensible Markup Language. A standard, semi-structured language used for Web documents. During a document authoring stage, XML "tags" are embedded within the informational content of the document. When the Web document (or "XML document") is subsequently transmitted by a Web server to a Web browser, the tags are interpreted by the browser and used to parse and display the document. In addition to specifying how the Web browser is to display the document, XML tags can be used to create hyperlinks to other Web documents.

FIG. 1 portrays an exemplary overall environment in which a system, a service, a software program product, and an associated method for providing Integrated Financing Services may be used. System 10 includes a software programming code or computer program product that is installed on a host server 15. While the system 10 will be described in connection with the WWW, the system 10 can be used within, for example, a wide area network, a local network, or any type of network over which computers may be connected.

A lessor 20 utilizes the financing services system 10 to provide leasing information to a vendor 25. The vendor 25 utilizes a vendor server 30 that comprises an electronic catalog 35 of products. The electronic catalog 35 is accessed through the Internet by users, such as customer 40, via the cloud-like communication network 45 or through the local network of the vendor by the vendor's sales agents. The customer 40, vendor 25, and lessor 20 are connected through the network 45.

The host server 15 is connected to the internet 45. The vendor server 30 and customer 40 can be connected via communications links 55, 60 respectively.

The Integrated Financing Services Lease Rates Subscription web service (LeaseRatesRequest) of System 10 enables lessor 20 to automatically provide the latest lease prices to vendor 25. Vendor 25 may present these lease prices next to a purchase price of a product listed in electronic catalog 35 in either a general or customer-specific situation.

The subscription service allows Vendor 25 to initiate a request as a subscriber of lessor 20 lease rates. The subscription request identifies the catalog contents of vendor 25 so that lessor 20 and system 10 can provide the appropriate rates for the catalog. If the catalog is a customer specific catalog, Vendor 25 subscription request will also include information about the customer so that entitled lease rates can be provided.

On system 10, receipt of the subscription request will establish the subscription profile needed to correctly associate the appropriate lease rates for the catalog. The service will complete the creation of the subscription by adding connection definitions associated with the vendor 25 catalog and the catalog server to the system 10 server and returns a confirmation to the vendor server that the subscription has been established. A publish rates service (LeaseRatesPublisher) will be invoked by system 10 as a support function of the subscription service to publish new rates to the Vendor 25 catalog as the new rates are made available by lessor 20.

A customer-specific catalog is referenced as an "entitled electronic catalog 35". System 10 also allows vendor 25 to provide lease prices to a customer 40 for products from various competitive vendors. Customer 40 may access product offerings and lease prices from, for example, the vendor's Web site or a salesperson that is providing those values from a company internal order configuration tools (also supported by the same Integrated Financing Services). If there is no specific "entitled electronic catalog" for that customer, representative (planning) rates can be used for the customer for shopping comparisons.

For example, customer 40 can select products from the electronic catalog 35 that has been customized with the entitlements of customer 40. In this example, electronic catalog 35 would display periodic lease payments specific to customer 40 as part of the shopping experience. For each item selected from the electronic catalog 35, customer 40 may indicate whether the item will be leased or purchased. Upon receipt of invoice, customer 40 would be able to reconcile his or her purchase order to his or her invoice.

To provide lease rates to customer 40 in the electronic catalog 35, lessor 20 requires the details of the sales offerings that will be presented to the customer 40. The sales offering may take a variety of forms, for example, a list of products, predefined bundles of products, a configure-to-order product offering, etc.

For both general and entitled electronic catalog support, the rates of lessor 20 are tied to the residual value of the product being sold. A clear definition of the components that are included in the product offerings of the electronic catalog 35 may be passed to lessor 20 by vendor 25. In turn, lessor 20 automates the assignment of rates to the components that make up the sales offering for the electronic catalog 35.

Under the scenario of an entitled electronic catalog 35, lessor 20 would support numerous customer electronic catalogs 35 at any given time. In this case, the automated mapping of lease rates to product components is achieved to facilitate the ability to deliver rates in support of these entitled electronic catalogs 35.

System 10 embeds financing into the checkout process using several Web services.

One Web service is asynchronously accessed by vendor 25 to provide leasing prices on a line item-by-line item basis within the electronic catalog 35. Depending on the detail provided by vendor 25 in the request for those rates (at build and update of electronic catalog 35), these lease prices can map to the specificity of the electronic catalog 35. In other terms, if vendor 25 has an electronic catalog 35 designed for a specific customer 40 or industry, the provided lease prices could be tailored to those specifications as well. That "entitled" lease price could be pre-negotiated with credit and lease rates updated in a separate process.

Figure 2:
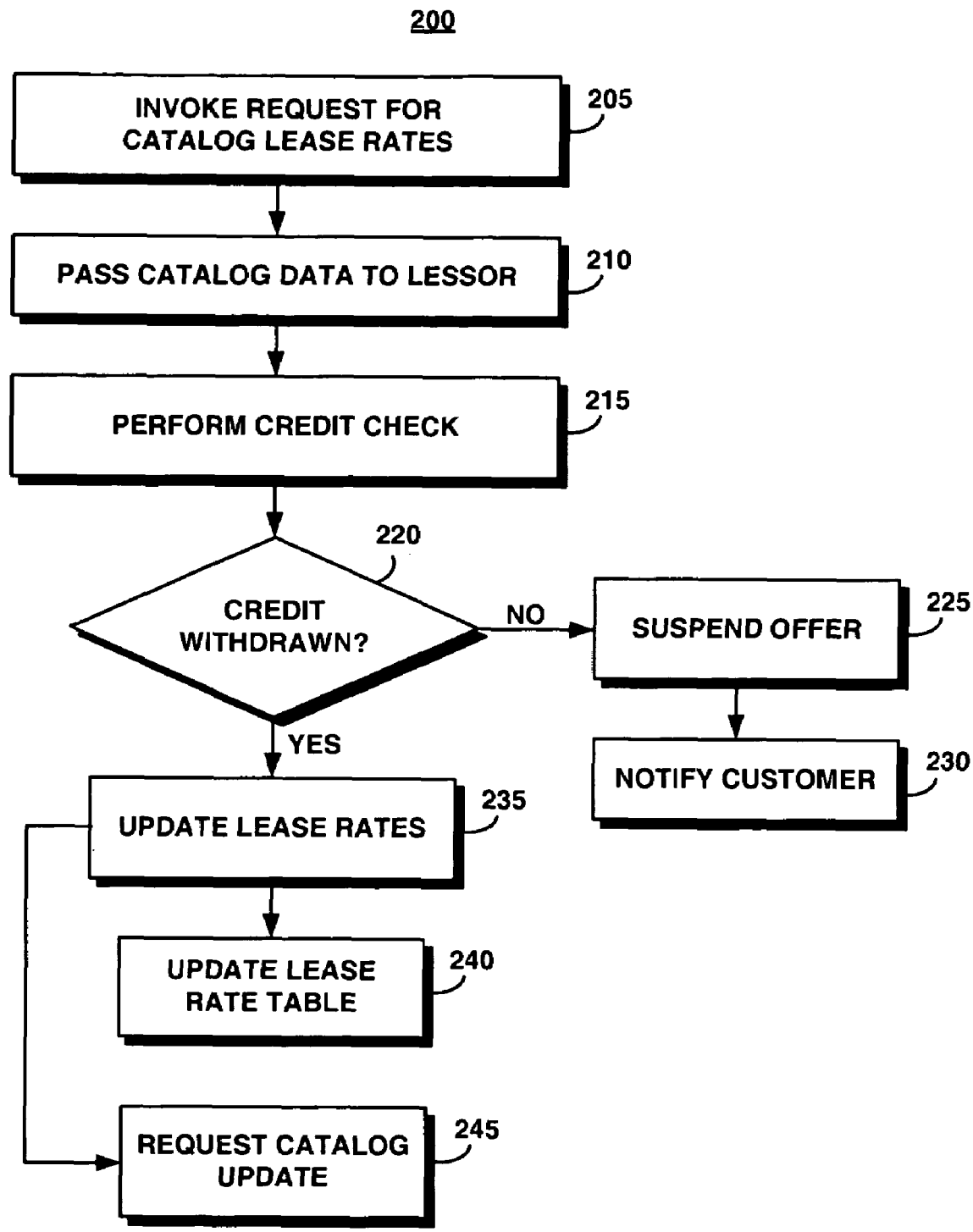
FIG. 2 is a process flow chart illustrating a method of operation for Integrating Financing Services/Web Service 1 of FIG. 1 in support of updating lease prices in an electronic catalog.

An exemplary service method 200 of system 10 in support of an entitled electronic catalog 35 and lease offer creation is illustrated by the process flow chart of FIG. 2. Through method 200, system 10 interacts with the entitled electronic catalog 35 of customer 40 as created by vendor 25. Vendor 25 creates the entitled electronic catalog 35 specific to customer 40.

In this case, the electronic catalog 35 is an entitled catalog 35 that lists sales prices and lease prices specific to customer 40. Vendor 25 invokes a request for lease rates for electronic catalog 35 at block 205. System 10 passes data in the electronic catalog 35 to the lessor 20 at block 210, so that lessor 20 may calculate lease rates for the specific items for the entitled electronic catalog 35.

At block 215, the Request Credit Check service (RequestCreditCheck) of system 10 is invoked to assess the customer's credit worthiness. If at block 220 the customer 40 is deemed to be credit worthy, system 10 updates the lease rates within the lessor 20 for that new customer 40 at block 235. System 10 loads leasing rates and other leasing information to a common table, at block 240, that is used to provide the entitled rates to the vendor 25 for this customer's future shopping experience.

System 10 will then request an update to the electronic catalog 35 owned by vendor 25 to set up the customer's catalog for future shopping experience. This set up will be initiated a call from the vendor 25 catalog server via the Lease Rates Subscription web service (LeaseRatesRequest) to system 10. The updated leasing rates and other leasing information are then available for on-demand lease price calculations from the entitled electronic catalog 35 of customer 40 as provided by vendor 25.

(2) Another Web service is dynamically accessed at checkout by customer 40 through the vendor system when a leasing payment option is being selected. System 10 calculates the final lease price in the form of a proposal or firm rate, depending on the level of approvals previously attained between the customer 40 and lessor 20 or accepted risk within the lessor 20. Get Lease Quote web service (PeriodicLeasePaymentCalculation) will be invoked to return the firm rates. The firm rates will be displayed via the vendor's web page or via the Integrated Financing Services web page depending on the vendor's preference. If the customer was an entitled customer, the customer may approve acceptance of the rates via an electronic approval.

In the event that the customer is not an entitled customer, calculation of the final lease price may require system 10 to call the Request Credit Check service (RequestCreditCheck) for the un-entitled customer. A proposal may also be required to present the final lease prices to the customer. When a proposal is required, the generate proposal service (GenerateLeaseProposal) of system 10 will generate the lease proposal for the customer's review and approval.

Under certain customer scenarios, an immediate response with lease rates may not be feasible due to additional process steps that must be completed by lessor 20n. Under these scenarios, system 10 will provide a message that indicates an immediate lease price is not available and the customer will be advised with a response will be ready for review. The delayed response will occur via an update lease status service (UpdateLeaseStatus) module 712, where the customer will be instructed to return to the site via an e-mail notification (block 380, FIG. 3B).

Figure 3A:
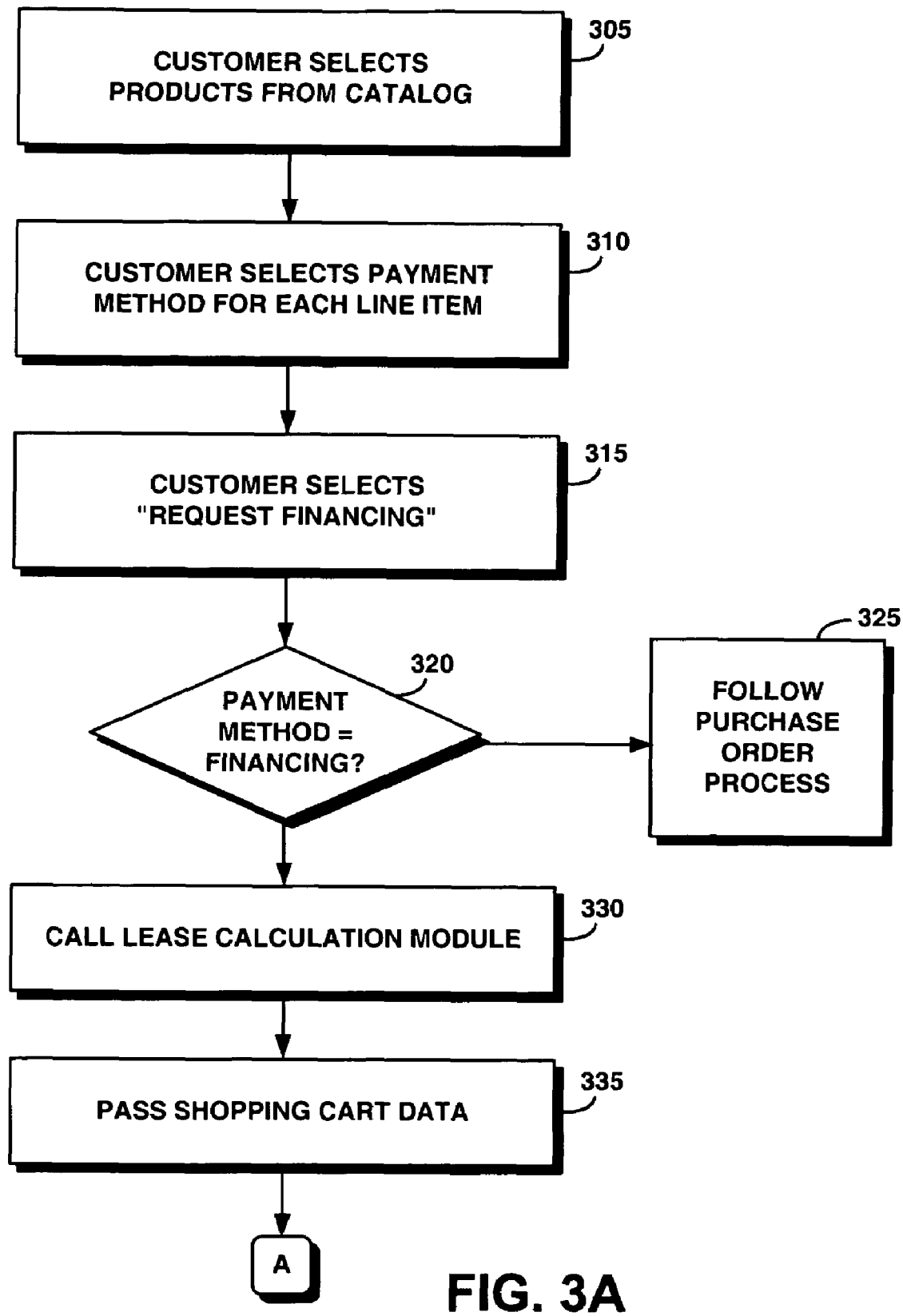
FIG. 3 is comprised of FIGS. 3A and 3B, and represents a process flow chart illustrating a method of operation of the Integrated Financing Services/Web Service 2 of FIG. 1 in support of a user's shopping experience.
Figure 3B:
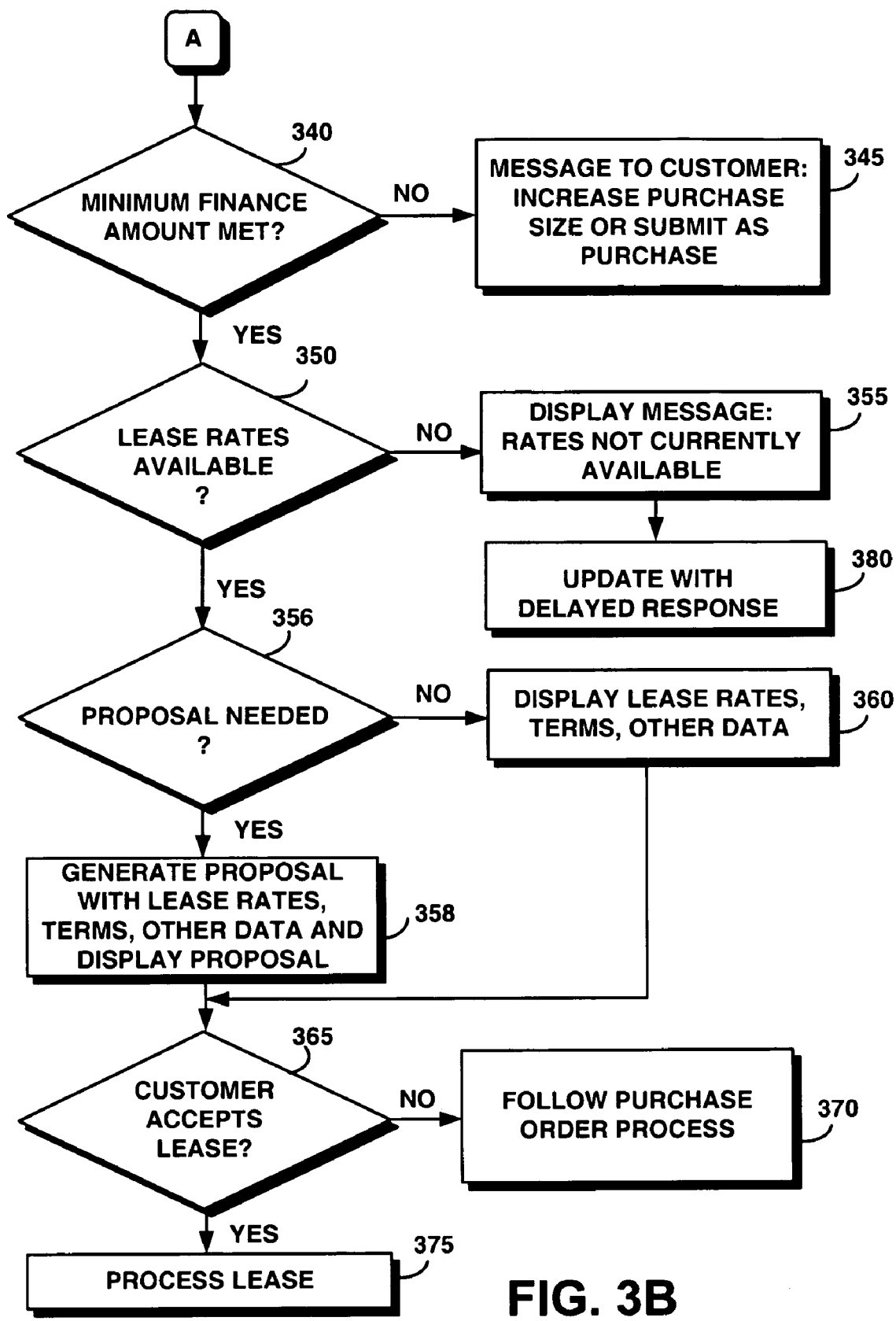

FIG. 3 (FIGS. 3A and 3B) illustrates an exemplary service method 300 of system 10 in support of the shopping experience of customer 40 as customer 40 shops from an electronic catalog 35 and places an order on lease. This customer already has a leasing contract, entitled rates and a pre-approved credit.

Customer 40 selects products from the electronic catalog 35 (block 305). Customer 40 may then select a payment method for each line item in the shopping cart of the electronic catalog 35 of vendor 25 (block 310), allowing for the purchase and lease mixed orders. For example, customer 40 may select five desktop computers, five monitors, and one laptop computer for purchase. Customer 40 may request financing for the computers and monitors but not the laptop.

Having selected financing for some of the items in the shopping cart, the customer 40 then selects "request financing" at block 315. Vendor 25 calls the lease calculation web service or module (PeriodicLeasePaymentCalculation) 707 of system 10 at block 330 and passes the shopping cart data to lessor 20 at block 335. The shopping cart data comprises items being purchased, such as quantity, information about customer 40, and so forth. The lease calculation module 707 calculates the lease price for a proposal module 714 to generate the lease price to the customer 40.

System 10 then takes over the "shopping experience." This means the screens are now owned by system 10 but it appears seamless to the end user that they are no longer on the "vendor owned" screen. The Get Lease Quote web service of System 10 first determines whether a minimum finance value has been met by the purchase made by customer 40 at decision block 340 (FIG. 3B).

If the purchase amount is too small for financing, the Get Lease Quote web service system 10 sends a message to customer 40, for example, "Increase purchase size or submit as purchase". This informs customer 40 that the order is too small for financing and should be increased if financing is desired.

If the minimum finance amount is met at decision block 340, the Get Lease Quote web service (also referred to herein as the Get Lease Calculation service) of system 10 determines at block 350 if lease rates are available for the items selected by the customer 40 for financing. If lease rates are not available, system 10 displays, at block 355, a message to the customer 40, for example, "Rates not currently available," and provides the update with the delayed response at block 380, as explained above.

If it is determined at decision block 350 that the lease rates are available for the items in the shopping cart of customer 40, and that a proposal is not needed (block 356), the initial periodic lease payment is calculated on the configured purchase price where applicable for electronic catalog 35, and the periodic lease payments along with the lease rates, lease term and other appropriate terms and conditions are then displayed (block 360), and method 300 proceeds to decision block 365 which will be described later in more detail. In another embodiment, the present system displays the content of the lease proposal in country-specific format, such as the local country language and currency based upon customer preferences.

Once the customer has completed configuring and accepting the lease (block 365), the lease is processed at block 375. The orders are then passed back to the vendor system with associated periodic lease payment detail. The vendor system then submits through a gateway to a transaction hub from business to business procurement initiated orders. Orders initiated via the non-B2B electronic catalogs 35 or vendor's sales agent configurators are then submitted to the vendor fulfillment system. Submitted orders will carry lease data that will flow through the vendor fulfillment systems to the lessor at the time of invoice for lease processing.

If at decision block 365 it is determined that the customer did not accept the lease, method 300 follows the regular purchase order process at block 370.

A screen shot of an exemplary shopping cart 500 is shown in FIG. 5 after customer 40 has selected items from the electronic catalog 35 of vendor 25, illustrating a service provided to customer 40 and vendor 25 by system 10. While shopping, customer 40 has selected items 505. When the selection of items 505 is complete, customer 40 has the option of check out 510 or request leasing 515. Check out 510 initiates a standard purchase process of items 505 from vendor 25.

The selection of request leasing 515 by customer 40 displays a financing selection screen. A screen shot of an exemplary financing selection screen 600 is shown in FIG. 6, illustrating another financing service of system 10. Lease options 605 are displayed for each line item in the shopping cart of customer 40. Other lease variables such as, for example, term 610 and offer 615 may be customized by customer 40.

If a lease value can not be calculated for a purchase item, system 10 presents a message to the customer 40, as shown by message 620. After selecting lease terms as presented by lease options 605, term 620, and offer 615, customer 40 may request re-calculation of lease payments by system 10 by selecting re-calculate 625. Customer 40 may accept the lease prices by selecting "accept lease price" 630. Alternatively, the customer 40 may select "continue shopping" 635 to continue adding items to the shopping cart.

(3) A further Web service, credit confirmation (GetCreditConfirmation), is accessed by the customer fulfillment agent of the vendor 25 to validate that shipment should be made to the customer 40 based on completion of leasing agreement. This web service verifies that the customer 40 has sufficient credit to obtain the lease in question (block 435 of FIG. 4). If lessor 20 withdraws credit as a result of the credit confirmation check (decision block 440), system 10 suspends the credit offer at block 445, and notifies the customer 40 at block 450.

Figure 4:
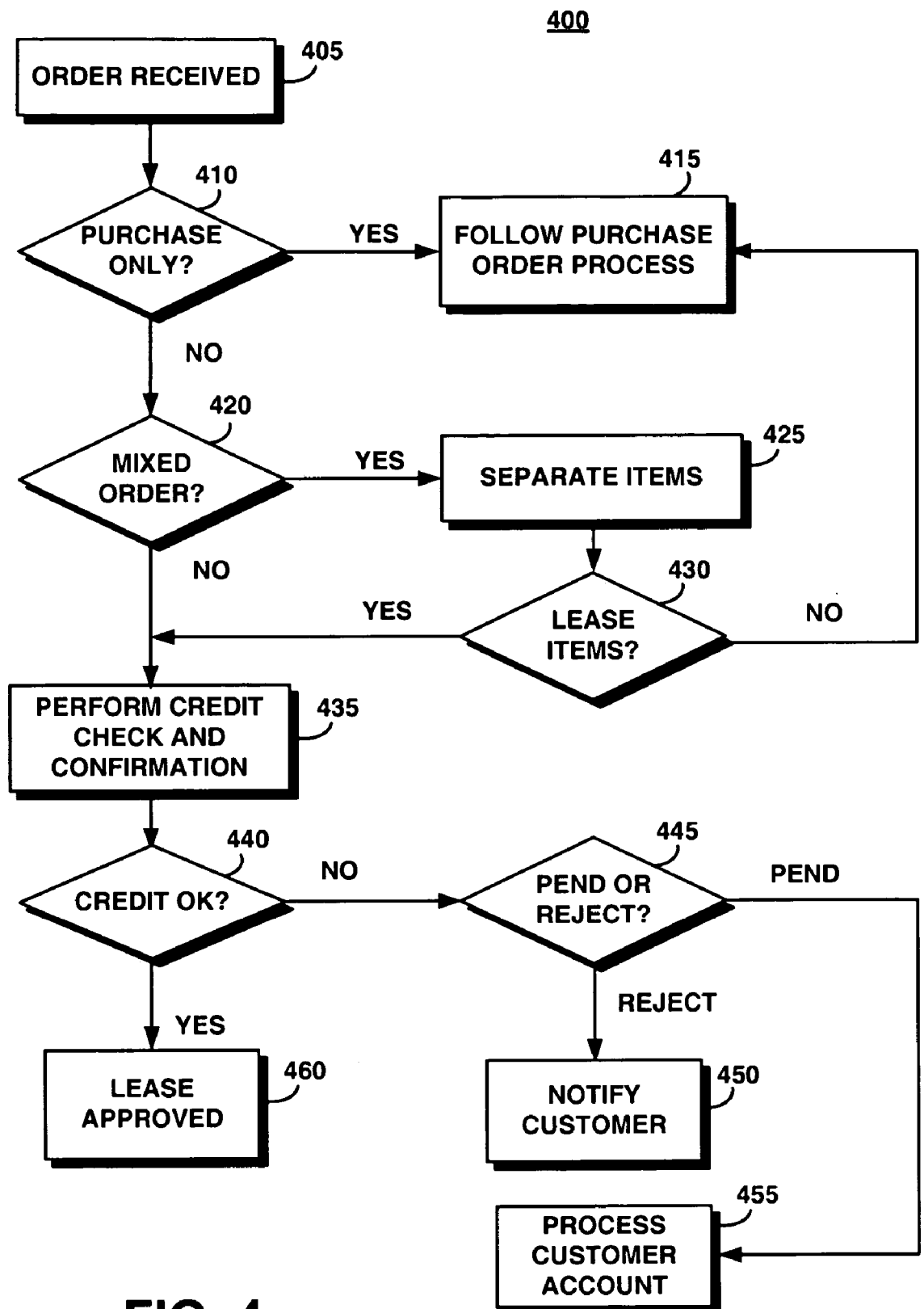
FIG. 4 is a process flow chart illustrating Integrated Financing Services/Web Service 3 of FIG. 1 in support of vendor order management.

FIG. 4 illustrates an exemplary service method 400 of system 10 in support of order management by vendor 25. At block 405, an order is received by vendor 25. Customer 40 may have selected some items in the order for financing, and others for purchase, creating a mixed order.

The vendor fulfillment system or administrator transfers information to lessor 20 at block 435 so that a credit capacity check (GetCreditConformation) may be performed for customer 40. System 10 determines whether the credit capacity of customer 40 is sufficient at decision block 440.

If the credit capacity of customer 40 is insufficient, the lessor 20 determines whether to pend or reject the lease application at decision block 445. If, in real time, the credit capacity of customer 40 is adequate, then the lease is approved at block 460. The lease price presented to the customer 40 may be based on the credit rating of the customer 40. The manufacture of an order may be dependent on the approval of the lease. In this case, the information relayed from the lessor 20 allows the vendor 25 to manufacture the items and ship them to the customer 40.

Figure 7A:
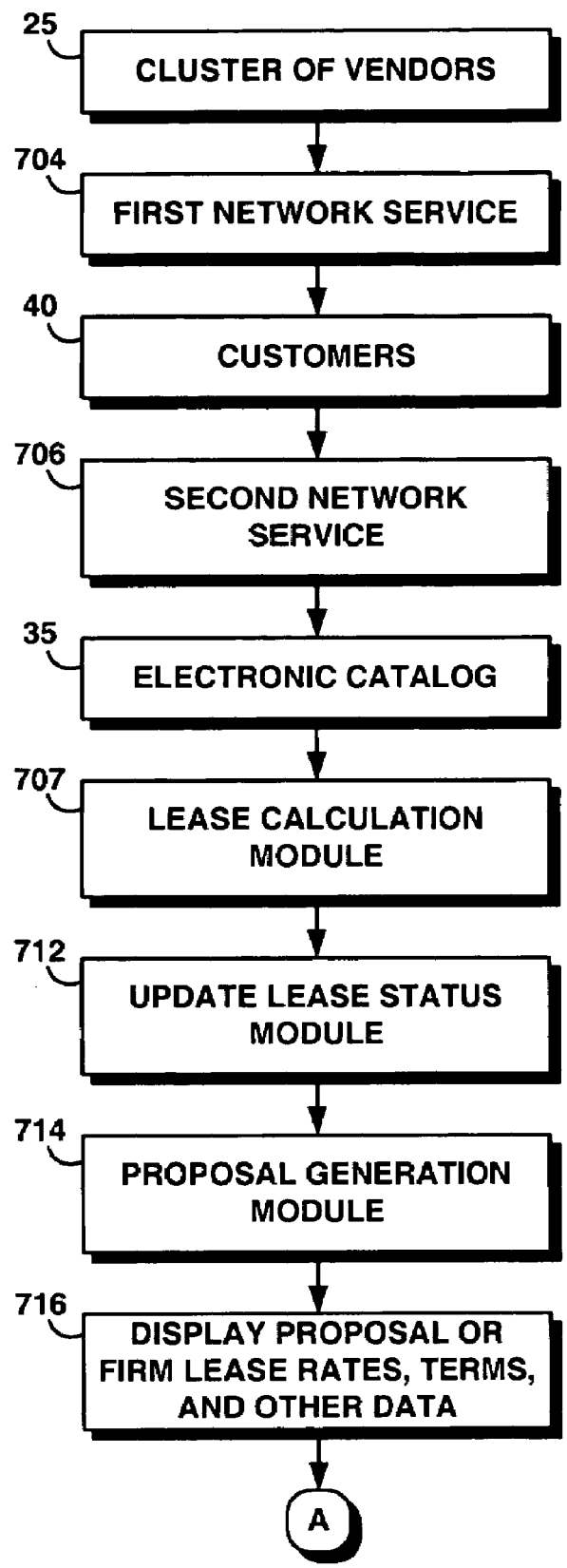
FIGS. 7 and 8 are block diagrams illustrating the main components of the financing services system of the present invention.
Figure 7B:
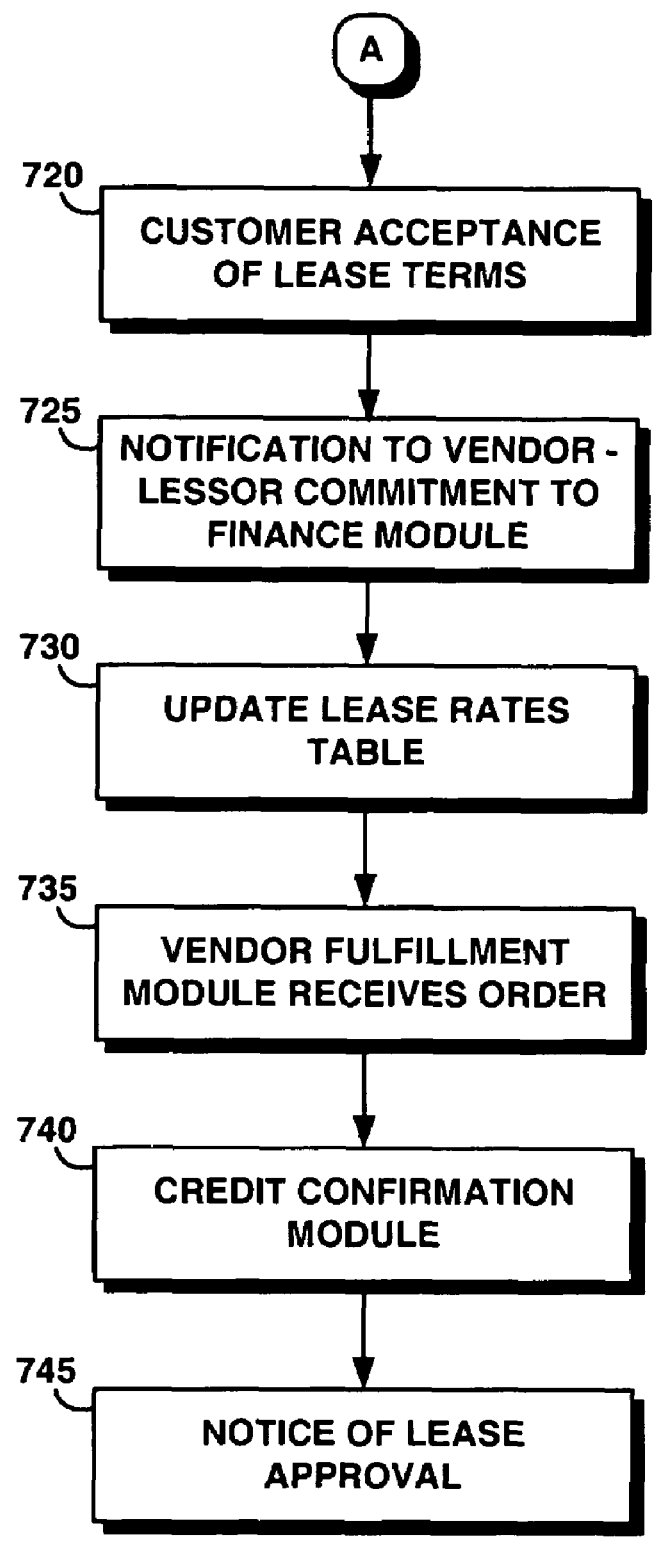
Figure 8:
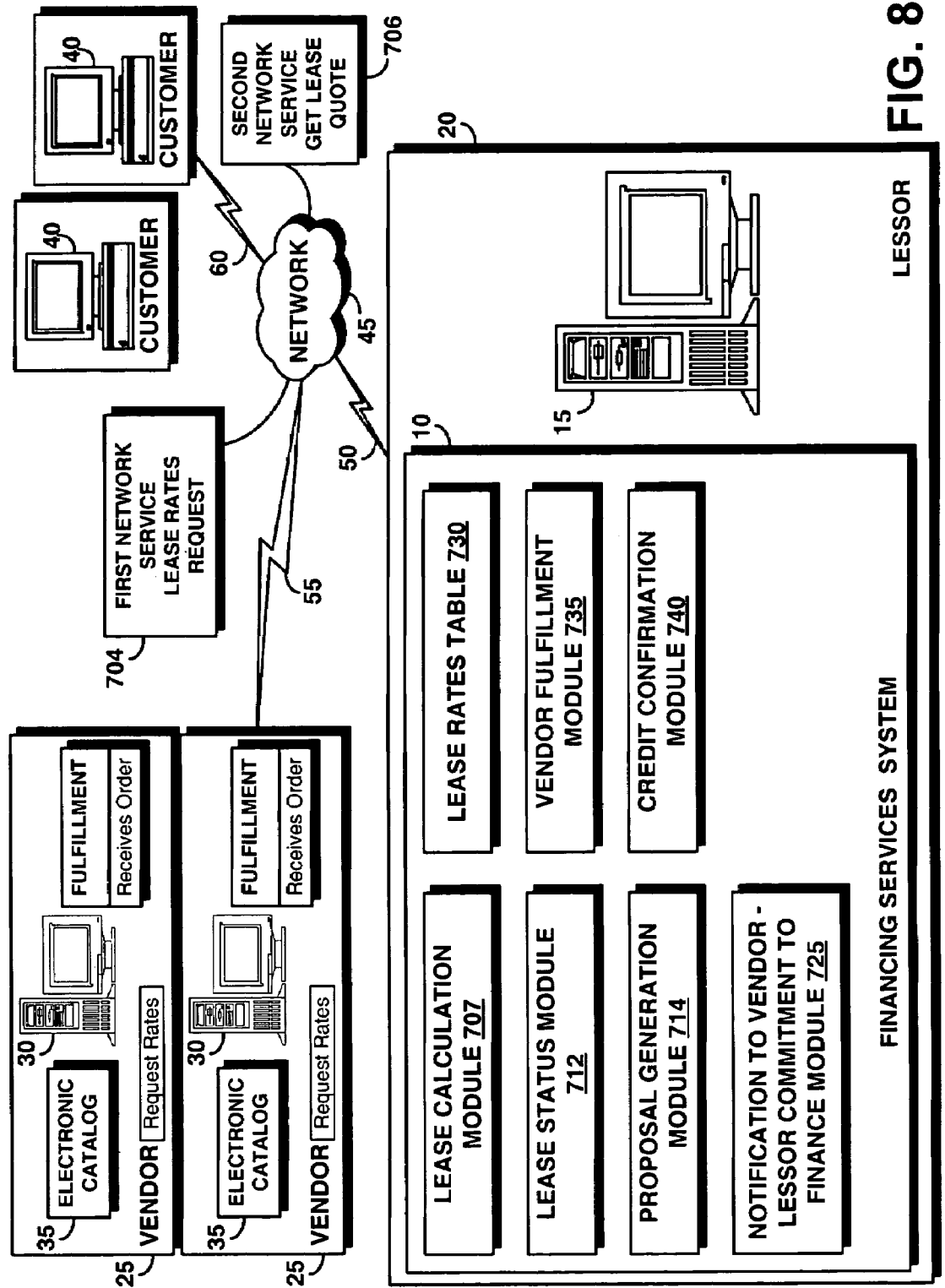

With further reference to FIGS. 7 and 8, the vendors 25 access the present system 10 over a first network service 704, within network 45, to provide leasing prices for items within the electronic shopping catalog 35. The customers could access the present system 10 over a second network service 706, within network 45, upon selection of a payment option for an item within the electronic shopping catalog 35, to obtain a lease quote from vendor or vendors 25. A lease calculation module 707 automatically determines lease conditions or terms for the selected item.

A proposal generation module 714 automatically proposes the lease conditions to the customer 40 for approval, as an alternative to a direct purchase of the item. A display 716 displays, to the customer 40, the proposed or firm lease rates, terms, and other data to the customer 40.

Upon approval of the lease terms 720, by the customer 40, a vendor-lessor commitment to finance module 725 sends an acknowledgement to the sale agent of the vendor 25 that the sale of the item is based on the lease conditions that have been approved by the customer. The present system 10 then updates the lease rate table 730 for the items in the electronic shopping catalog 35.

A vendor fulfillment module 735 at the corresponding vendor 25 receives the customer's order, and the a credit check and confirmation module 740 having performed a credit check on the customer 40 for use in determining the lease rate for the items within the electronic shopping catalog 35, confirms the order and sends a notice of lease approval 745 to the customer 40.

It is to be understood that the specific embodiments of the invention that have been described are merely illustrative of certain applications of the principle of the present invention. Numerous modifications may be made to the system and method for providing a financing services solution invention described herein without departing from the spirit and scope of the present invention. Moreover, while the present invention is described for illustration purpose only in relation to the WWW, it should be clear that the invention is applicable as well to, for example, a wide area network, a local network, or any type of network over which computers may be connected.

What is claimed is:

1. A processor-implemented system for providing an integrated financing service that allows a plurality of vendors to integrate a leasing service as part of a sales transaction, the system comprising:

a computer configured to communicate via a network;

a first network device configured to communicate with the computer, and to provide lease prices for items within an electronic shopping catalog to a plurality of vendors;

a second network device to request lease terms from a vendor, upon a selection by a customer of a payment option for an item within the electronic shopping catalog;

a lease calculation device for automatically determining the lease terms for the item;

a proposal generation device for automatically transmitting and proposing the lease terms via the network to the customer for approval, as an alternative to a direct purchase of the item; and a vendor commitment to finance module configured to send an acknowledgement to the plurality of vendors via the network in response to an approval by the customer, acknowledging that the sale of the item is based on the lease terms that have been approved by the customer.

2. The system of claim 1, wherein the first network device comprises an Internet service.

3. The system of claim 1, wherein the second network service comprises an Internet service.

4. The system of claim 1, wherein the lease terms comprise a lease rate.

5. The system of claim 4, further comprising an update lease rate table module for updating a lease rate table for at least some of the items in the electronic shopping catalog.

6. The system of claim 5, wherein the electronic shopping catalog comprises a catalog that is specific to the customer.

7. The system of claim 5, further comprising a credit check device for performing a credit check on the customer for use in determining the lease rate for the items within the electronic shopping catalog.

8. The system of claim 1, wherein the lease terms comprise a lease prices; and further comprising a lease calculation module for calling a lease calculation made for the items in the electronic shopping catalog.

9. The system of claim 8, wherein the lease calculation module determines the lease terms for the item comprises determining a monthly lease payment for the item.

10. The system of claim 9, wherein the lease calculation module determines whether a minimum finance amount has been met by an accumulated value of items that are to be financed and that are deposited in a customer's electronic shopping cart.

11. The system of claim 8, wherein the customer accesses the second network device at customer checkout.

12. The system of claim 8, wherein the lease calculation module presents the lease price in the form of a proposal.

13. The system of claim 8, wherein the lease calculation module presents the lease price in the form of a firm rate.

14. The system of claim 8, further comprising an update lease status device for providing a delayed response to the customer.

15. The system of claim 14, further comprising a notification module for notifying the customer of the availability of the lease price.

16. The system of claim 1 lease calculation module, wherein the lease calculation module determines whether lease rates are available for the items in the customer's electronic shopping cart.

17. The system of claim 16, further comprising a display for displaying in the electronic shopping catalog, the lease rates and a plurality of lease terms for the items in the electronic shopping cart.

18. The system of claim 1, further comprising a credit confirmation module for verifying a customer's credit worthiness.

19. The system of claim 1, wherein the plurality of vendors provide the purchase prices for which lease prices have been calculated on a line item-by-line item basis within the electronic shopping catalog.

20. The system of claim 1, further comprising displaying the lease terms in a country-specific format.

21. A processor-implemented method for providing an integrated financing service that allows a plurality of vendors to integrate a leasing service as part of a sales transaction, the method comprising:

provide lease prices for items within an electronic shopping catalog to a plurality of vendors;

requesting lease terms from a vendor, upon a selection by a customer of a payment option for an item within the electronic shopping catalog;

automatically determining the lease terms for the item;

automatically proposing the lease terms to the customer for approval, as an alternative to a direct purchase of the item; and sending an acknowledgement to the plurality of vendors that the sale of the item is based on the lease terms that have been approved by the customer, upon approval by the customer.

22. A computer program product having a plurality of executable instruction codes stored on a computer usable medium, for providing an integrated financing service that allows a plurality of vendors to integrate a leasing service as pan of a sales transaction, the computer program product comprising:

a set of instruction codes for providing lease prices for items within an electronic shopping catalog to a plurality of vendors;

a set of instruction codes for requesting lease terms from a vendor, upon a selection by a customer of a payment option for an item within the electronic shopping catalog;

a set of instruction codes for automatically determining the lease terms for the item;

a set of instruction codes for automatically proposing the lease terms to the customer for approval, as an alternative to a direct purchase of the item; and a set of instruction codes for sending an acknowledgement to the plurality of vendors that the sale of the item is based on the lease terms that have been approved by the customer, upon approval by the customer.

23. A service for providing an integrated financing service that allows a plurality of vendors to integrate a leasing service as part of a sales transaction, the service comprising:

a computer configured to communicate via a network;

a device configured to communicate with the computer, for providing lease prices for items within an electronic shopping catalog to a plurality of vendors;

a device for requesting lease terms from a vendor, upon a selection by a customer of a payment option for an item within the electronic shopping catalog;

a device for automatically determining the lease terms for the item;

a device for automatically transmitting and proposing the lease terms to the customer for approval via the network, as an alternative to a direct purchase of the item; and a device configured to send an acknowledgement to the plurality of vendors via the network in response to an approval by the customer, acknowledging that the sale of the item is based on the lease terms that have been approved by the customer.

* * * * *